INVENTOR
FRITZ LANGE ET AL

United States Patent Office 3,551,329
Patented Dec. 29, 1970

3,551,329
PROCESS OF DIFFUSING A MATERIAL IN A LIQUID PHASE
Fritz Lange, Berlin-Buch, and Gunter Dreyer, Berlin, Germany, assignors to Deutsche Akademie der Wissen Schaften zu Berlin, Berlin-Adlershof, Germany
Filed July 11, 1966, Ser. No. 564,304
Int. Cl. B01d 11/04
U.S. Cl. 210—19                      2 Claims

ABSTRACT OF THE DISCLOSURE

The diffusion zone is formed by the limiting surface between two liquid bodies in a capillary tube. The capillary tube communicates with a first vessel containing a liquid body with a suspended material, and with a second vessel containing the liquid into which the materail is to be diffused. A reciprocating plunger is disposed in one of the vessels to bulge alternately the limiting surface from one liquid body into the other one and thus increase the effective area of the diffusion zone.

---

The present invention relates to the diffusion of a material suspended in one body of fluid from the latter fluid into another body of fluid. Such diffusion processes are well known for the purpose of separating materials as well as for measuring devices. Moreover, a diffusion process of this type is particularly useful when the fluid bodies are in the liquid phase.

It is a primary object of the present invention to provide a process of this type according to which it becomes possible to greatly increase the rate of diffusion of the suspended material from one fluid body into the other, particularly when the bodies are in the liquid phase. It is especially when dealing with fluid bodies in the liquid phase that it has heretofore been impossible to achieve desired diffusion speeds. Because of the relatively low rate of diffusion now possible with fluid bodies in the form of liquids, solutions, or mixtures thereof, there is a great need for an increase in the speed of diffusion.

The process of the invention is useful for the diffusion of material not only suspended in liquids, but also in gases, so that it becomes possible to operate with liquids, solutions, and gases, as well as to carry out separations of suitable mixtures and isotopes.

There are known diffusion installations by means of which it is possible to measure diffusion methods or to separate mixtures. Moreover, there are known processes which make it possible to multiply a relatively low diffusion separation factor, but as a result of the relatively slow rate of diffusion in the liquid phase, which is to say the relatively small amount of liquid particles or dissolved matter which can become diffused in a given unit of time, such installations and processes have not been widely used in a practical way, and certainly not to the same extent as diffusion where the fluid bodies are in the gaseous phase.

The rate of diffusion is inversely proportional to the length of the path of diffusion, while being proportional to the surface through which the diffusion takes place as well as proportional to the extent of concentration of the material which is to be diffused.

There are known processes according to which, in order to create a predetermined degree of concentration, the diffusion takes place through a diffusion zone formed by a network, a system of laminations, or a filter, this diffusion zone opposing a mixing of the fluid bodies. According to these known processes, the path of diffusion is determined by the linear size of the diffusion zone in the diffusing direction and the diffusion area is determined by the clear space provided by the pores or by the lamination cross sections. Thus, the rate of diffusion with these known processes is limited by the geometric dimensions of the diffusion zone, and the linear size of this zone in the diffusion direction can only be reduced and its relative cross sectional area can only be increased in acocrdance with the cross section of the wall thickness of the netting, the wall thickness of the laminations, or the thickness of the filter walls, these limitations being required to reliably suppress any tendency for the fluid bodies to mix together and in order to maintain their mechanical stability.

It is therefore a primary object of the invention, as pointed out above, to provide a process which enables the rate of diffusion to be considerably increased, while maintaining the desired degree of concentration and at the same time providing a diffusion path which is considerably smaller than would normally be expected by the thickness of the diffusion zone (linear size of the apparatus in the diffusing direction).

Moreover, it is an object of the invention to provide a process which makes it possible to considerably increase the transverse diffusion area beyond the limits which would normally be expected from the transverse clearance provided by the laminations or pores of the diffusing structure.

In accordance with the present invention, the pair of fluid bodies are brought into engagement with each other so as to define at their interface a limiting diffusion surface through which diffusion takes place, and while the diffusion zone of an apparatus used with the process of the invention can also take the form of a network system, a lamination system, or a tubular system, or can be made of a porous material, mixing of the fluid bodies is reliably avoided and at the same time a considerable increase in the rate of diffusion is achieved, while maintaining the path of diffusion short and the surface area through which diffusion takes place largely, by providing for the fluid bodies alternate pulsations into and out of the diffusion zone so that one of the fluid bodies will bulge into the other during one pulsation while the other of the fluid bodies will bulge into the one fluid body during the next folowing pulsation, and so on. In this way the surface through which diffusion takes place is considerably increased.

As was mentioned above, the invention is particularly applicable to fluid in the liquid phase, and the fluid can have either a laminar or a turbulent flow. Moreover, the above-described process of the invention can take place by way of providing an oscillating movement of the diffusion zone itself, which is to say of the apparatus which forms the diffusion zone, rather than acting on the fluid bodies to pulsate the latter, so that in this way there is still achieved a fluid pulsation, even though it is the apparatus and not the fluid which is pulsated. Furthermore, it is possible to use for the diffusion zone a foam rubber or other foam plastic forming a compressible and expandable cellular material which, by alternate compression and expansion, will provide the fluid pulsations which will increase the rate of diffusion.

The process of the present invention is particularly promising for use with known separation installations where in order to achieve a fixed concentration distribution the diffusion takes place in countercurrent with respect to a flowing solvent medium, and in addition a fluid circulation perpendicular to the countercurrent is provided so as to multiply the diffusion-separating factor. Through these measures it is possible to achieve an economically significant increase in the separating action, as a result of the increased rate of diffusion.

The technical and economic results of the invention provide in the above-described simple manner a rate of diffusion whose productivity can be increased several times as compared to known diffusion processes. Thus, the present invention forms the basis for a practical and economical use of diffusion for fluids in the liquid phase.

The invention is described in connection with the accompanying drawings which form part of this application, which schematically illustrate only one possible embodiment of an apparatus used for the process of the invention, and in which.

Figure 1:
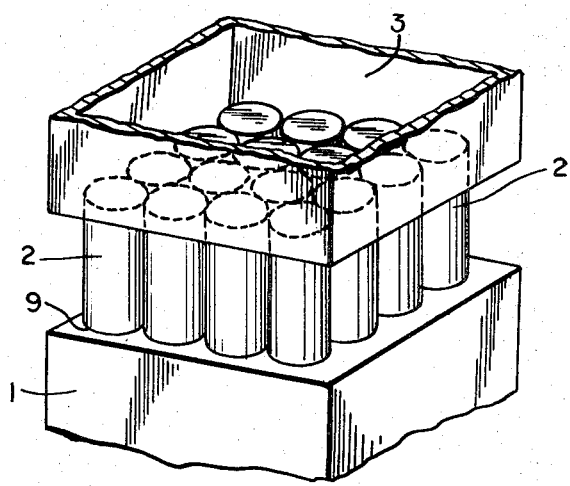
FIG. 1 is a schematic perspective illustration of a diffusion zone formed by a system of capillary tubes.

Referring now to the drawings, the system of capillary tubes shown in FIG. 1 define a diffusion zone between a pair of fluid bodies in the form of one fluid body situated in a suitable vessel 1 and taking the form of a watery solution of a suitable dyestuff which is dissolved in the liquid within the vessel 1. The vessel 3 contains water which forms the other of the fluid bodies and into which the diffusion is to take place from the body of fluid in the vessel 1. These vessels 1 and 3 communicate with each other through the system of capillary tubes 2 which are situated between and communicate with both of these vessels, as shown schematically for a single capillary tube in FIGS. 2 and 3.

Figure 2:
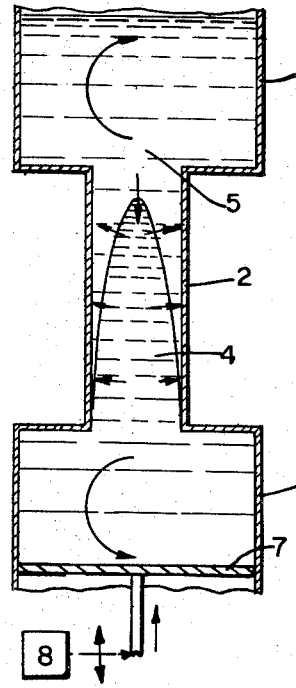
FIG. 2 is a schematic illustration of one of the pulsations of the process of the invention.

Assuming now that there is a pulsation which bulges the solution in the vessel 1 into the system of capillary tubes, then the watery dyestuff solution presses into the capillary tubes, as shown schematically in FIG. 2, so as to form in accordance with the speed distribution of the moving liquid bodies a laminar streaming fluid medium in the narrow capillary tubes in each of which the limiting interface between the fluid bodies, where they engage each other to define the surface through which diffusion takes place, has the form of a paraboloid 4. From the paraboloid 4 the diffusion takes place in the direction indicated by the arrows in FIG. 2 into the volume of water 5. The dyestuff solution 1, which thus has its content of dyestuff particles depleted in the paraboloid 4, becomes, during the next pulsation, drawn out of the system of capillary tubes back into the vessel 1, and by convection this parabolic portion of the solution is again brought up to the prevailing concentration.

Figure 3:
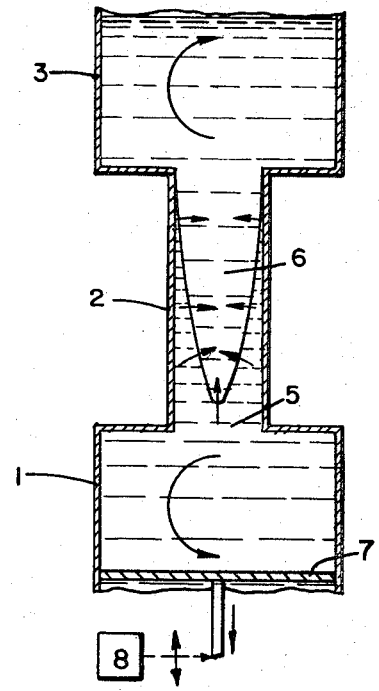
FIG. 3 is a schematic illustration of the next following pulsation, these pulsations taking place in capillary tubes of the type schematically shown in FIG. 1.

As is shown in FIG. 3, during the pulsation which follows that shown in FIG. 2, the paraboloid 4 is withdrawn from each capillary tube 2 and instead water from the vessel 3 enters into each capillary tube 2 so as to form a water paraboloid 6 therein. In this way the dyestuff particles which were diffused in the body of water 5 in FIG. 2 become diffused into the water paraboloid 6, and thus reach during the subsequent withdrawal of the paraboloid 6 into the vessel 3 the interior of the latter. The particles which are thus displaced into the body of water in the vessel 3 become mixed into the body of water by convection within the vessel 3.

Thus, by withdrawing the paraboloid 6 out of each capillary tube 2, not only does additional dyestuff solution flow into each capillary tube 2, in the manner shown in FIG. 2 and described above, but in addition the flow of the diffused material into the body of water in the vessel 3 takes place, so that in this way the alternate pulsations provide the increased rate of diffusion achieved with the process of the present invention. As a result of the alternate flow of the fluid bodies into and out of the capillary tubes and mixing in the vessels the extent of concentration is maintained constant. The length of the path of diffusion is only a small fraction of the diameter of each capillary tube while the surface area through which diffusion takes place is considerably increased as compared to the transverse cross sectional areas of the capillary tubes 2, this increase being achieved by way of the surface areas of the paraboloids 4 and 6.

In order to achieve the pulsations of the fluid bodies, it is possible, for example, to introduce a plunger 7 into the vessel 1, slidably engaging its inner side surface and being driven back and forth through a suitable eccentric drive 8, so as to provide an alternate compression and suction action.

In the event, however, that it is not desired to move the liquid mixtures, then the capillary system situated between the vessels 1 and 3 can be displaced back and forth through a suitable eccentric drive 8 which presses the entire capillary system of tubes 2 first into the vessel 3 while moving out of the vessel 1 and then into the vessel 1 while moving out of the vessel 3, the tubes having in this case a suitable fluid-tight sliding engagement 9 with the vessels.

Furthermore, the stationary capillary system can be replaced by a flexible elastic foam material such as foam rubber, for example, which can be alternatively compressed and expanded also by way of a suitable eccentric drive.

It is not essential to provide for a laminar flow of the fluid into or out of the diffusion zone. Instead the flow can be tubulent. In accordance with the different speed distributions of a turbulent flow as compared to a laminar flow, in this case the paraboloids 4 and 6 of FIGS. 2 and 3 will become flattened and broadened. The diffusion path now will take place at the so-called Prandtl limiting surface defined at the interface where the fluid bodies engage each other. Since at this latter limiting surface a laminar flow takes place, the process is completely analogous with that described above. As a result of the relatively small thickness of the limiting interface where the fluid bodies engage each other and as a result of the enlarged area of this limiting surface with a turbulent flow, the rate of diflusion is considerably increased.

The process of the invention can be used where a recirculation system is provided as, for example, by continuously vaporizing water from the solution in the vessel 1 and condensing this water back into the vessel 3, to produce a circulating type of flow. A plurality of installations as shown in FIGS. 2 and 3 can be provided in side by side relation, for example, with an additional cyclic stream taking place.

From a theoretical standpoint as well as from actual tests carried out with the first embodiment described above, it has been possible to achieve with amplitudes of the pulsations only on the order of 2.5 cm. an increase in the rate of diffusion of approximately 10,000 times the rate of diffusion which could be achieved with a conventional apparatus of the same size, treating similar materials, and under these conditions a technically efficient diffusion path was still maintained.

What is claimed is:

1. A diffusion process for diffusing a material suspended in a first liquid body into a second liquid body which comprises establishing a diffusion cell consisting exclusively of a first liquid body containing a suspension including material to be diffused, a second liquid body containing said suspended material in a different concentration from that in said first liquid body, the difference in concentration between said first and second liquid bodies being sufficient to effect diffusion, said first and second liquid bodies being separated by a plurality of capillary diffusion zones, said first and second liquid bodies being in direct contacting engagement with each other in said capillary diffusion zones defining at their interfaces a limiting diffusion surface through which the diffusion takes place, said capillary diffusion zones having a length and diameter whereby mixing of the contents of said first and second liquid bodies is avoided and applying alternating pulsations to said bodies of liquid in a direction parallel to the axis of said capillary diffusion zones thereby causing the liquid bodies to alternately bulge into each other, the pulsations being of such a magnitude as to produce the alternate bulging in the form of parabolas of substantial magnitude whereby to increase the limiting diffusion surface and thus the diffusion rate.

2. A process according to claim 1 which comprises imparting said pulsations by means of a reciprocating plunger disposed in one of said liquid bodies.

References Cited

UNITED STATES PATENTS

| | | | |
|---|---|---|---|
| 2,692,854 | 10/1954 | Henley | 210—22X |
| 2,724,508 | 11/1955 | Luther | 210—19X |
| 2,766,881 | 10/1956 | Westervelt et al. | 210—19X |
| 3,206,397 | 9/1965 | Harvey | 210—19 |
| 3,223,748 | 12/1965 | Bohrer | 210—19X |
| 3,228,876 | 1/1966 | Mahon | 210—22 |
| 3,244,763 | 4/1966 | Cahn | 210—22X |
| 3,246,764 | 4/1966 | McCormack | 210—321 |
| 3,332,746 | 7/1967 | Claff et al. | 210—321X |
| 3,365,065 | 1/1968 | Varjabedian | 210—332 |
| 3,441,479 | 4/1969 | Jankay | 210—321X |

SAMIH N. ZAHARNA, Primary Examiner

U.S. Cl. X.R.

210—21